United States Patent
Jeske et al.

(10) Patent No.: US 7,184,497 B2
(45) Date of Patent: Feb. 27, 2007

(54) METHOD OF ESTIMATING A SIGNAL-TO-INTERFERENCE+NOISE RATIO (SINR)

(75) Inventors: Daniel R. Jeske, Monmouth, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 883 days.

(21) Appl. No.: 09/848,411

(22) Filed: May 4, 2001

(65) Prior Publication Data

US 2003/0016740 A1 Jan. 23, 2003

(51) Int. Cl.
H03D 1/04 (2006.01)
H03K 7/06 (2006.01)

(52) U.S. Cl. .................. 375/346; 375/316; 375/146

(58) Field of Classification Search ................ 375/316, 375/140, 147, 343, 346, 146, 295–297
See application file for complete search history.

(56) References Cited

U.S. PATENT DOCUMENTS

| | | | | |
|---|---|---|---|---|
| 5,809,065 | A * | 9/1998 | Dapper et al. | 375/216 |
| 5,991,273 | A * | 11/1999 | Abu-Dayya | 370/252 |
| 6,108,610 | A * | 8/2000 | Winn | 702/77 |
| 6,317,456 | B1 * | 11/2001 | Sayeed | 375/227 |
| 6,393,257 | B1 * | 5/2002 | Holtzman | 455/67.13 |
| 6,614,857 | B1 * | 9/2003 | Buehrer et al. | 375/340 |
| 6,690,944 | B1 * | 2/2004 | Lee et al. | 455/522 |

OTHER PUBLICATIONS

A. Furuskär et al., "EDGE: Enhanced Data Rates for GSM and TDMA/136 Evolution," IEEE *Personal Communications Magazine*, pp. 56-66, Jun. 1999.
C.E. Gilchriest, "Signal-to-Noise Monitoring," *JPL Space Programs Summary*, vol. IV, No. 32-37, pp. 169-184, Jun. 1966.
J.W. Layland, "On S/N Estimation," *JPL Space Programs Summary*, vol. III, No. 37-48, pp. 209-212, 1967.
D.R. Pauluzzi and N.C. Beaulieu, "A Comparison of SNR Estimation Techniques in the AWGN Channel," *Proceedings of IEEE Pacific Rim Conference on Communications, Computers and Signal Processing*, 36-39, 1995.
A.L. Rukhin, "Estimating the Noncentrality Parameter of A t-Distribution," *Systems Science and Mathematical Sciences*, vol. 5, No. 1, pp. 1-8, 1992.
K. Higuchi et al., "Experimental Evaluation of Combined Effect of Coherent Rake Combining and SIR-Based Fast Transmit Power Control for Reverse Link of DS-CDMA Mobile Radio," *IEEE Journal on Selected Areas in Comm.*, vol. 18, No. 8, pp. 1526-1535.
M.L. Tiku, "Doubly Noncentral F-Distributions—Tables and Applications," *Selected Tables in Mathematical Statistics*, vol. 2, pp. 139-149.

(Continued)

*Primary Examiner*—Chieh M. Fan
*Assistant Examiner*—Jason M. Perilla

(57) ABSTRACT

In the method of estimating a signal-to-interference+noise ratio (SINR), an initial SINR estimate is generated based on a mean of a plurality of samples and a sample variance estimate of the plurality of samples. Then, the initial SINR estimate is scaled and translated. Furthermore, SINR estimates based on pilot symbols and data symbols, respectively, are combined to form a composite estimate.

16 Claims, 3 Drawing Sheets

OTHER PUBLICATIONS

M.D. Austin and G.L. Stüber, "In-Service Signal Quality Estimation for TDMA Cellular Systems," *Proceedings of the Personal Indoor Mobile Radio Conference* (*PIMRC*), pp. 836-840, Sep. 1995.

M. Andersin et al., "Subspace Based Estimation of the Signal to Interference Ratio for TDMA Cellular Systems," *Proceedings of the Vehicular Technlogy Conference* (*VTC*), pp. 1155-1159, May 1996.

* cited by examiner

METHOD OF ESTIMATING A SIGNAL-TO-INTERFERENCE+NOISE RATIO (SINR)

BACKGROUND OF THE INVENTION

1. Field of the Invention

The present invention relates to wireless communication, and more particularly, a method of estimating a signal-to-interference+noise ratio.

2. Description of Related Art

Signal-to-Interference+Noise Ratio (SINR) is an important metric of communication link quality. SINR estimation is of particular importance for wireless data systems where resources are shared dynamically amongst users. Some applications of SINR estimates are: a) Power Control in CDMA Systems: the receiver estimates the SINR, compares it to a target and commands the transmitter to increase/decrease its transmitted power; and b) Rate Adaptation: the information bit-rate assigned to a user can be dynamically varied based on its link quality and the system load. While such adaptation has limited use in voice systems, it is extremely useful for wireless data systems. Consequently, inaccurate SINR estimates can severely degrade performance and resource utilization.

SUMMARY OF THE INVENTION

In the method of estimating a signal-to-interference+noise ratio (SINR) according to the present invention, a conventionally known SINR estimate is scaled and translated to produce a SINR estimate that has a substantially reduced mean square error. The SINR estimator according to the present invention operates on either pilot symbol samples or data symbol samples. Further according to the present invention, a pilot symbol based SINR estimate and a data symbol based SINR estimate are weighted and combined to generate a composite SINR estimate having a reduced mean square error as compared to either of the individual estimators.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE PREFERRED EMBODIMENTS

Figure 1:
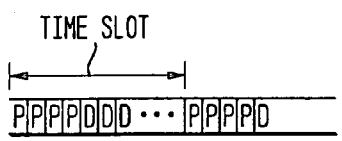
FIG. 1 illustrates pilot and data symbols multiplexed in a time slot.

In describing the method of estimating the signal-to-inteference+noise ratio according to the present invention, only Binary Phase Shift Keying (BPSK) modulation is considered although the methods and related analysis can be extended to other signaling schemes. Noise and interference are modeled together as additive white Gaussian noise (AWGN), but as will be appreciated from the following disclosure, this should not limit the application of the method according to the present invention. Transmission is organized into fixed duration timeslots, each containing pilot and data symbols as shown in FIG. 1. The channel attenuation and phase shift, assumed fixed over a timeslot, are treated as unknown constants rather than as random variables (no fading assumption).

First, to better understand the method according to the present invention, the conventional SINR estimation will be described. Typically, the received signal corresponding to the jth transmitted symbol (pilot or data) in the kth time slot is defined as $$Y_{kj}=a_{kj}\mu_k+\epsilon_{kj} \quad j=1, 2, \ldots, N, \tag{1}$$

where $\mu_k$ represents the received signal amplitude (product of transmitted amplitude and channel gain), $\epsilon_{kj}$ is a random variable that represents the noise+interference, $a_{kj}$ represents the symbol-value, and N is the number of samples (pilot or data). Information symbols could be +1 or −1 (in BPSK), while it is assumed (without any loss of generality) that pilot symbols are always +1. It is also assumed that the distribution that characterizes the noise+interference is Gaussian with zero mean and variance $\sigma^2$. The SINR in the kth time slot is defined as:

$$\Theta_k = \frac{\mu_k^2}{\sigma^2} \tag{2}$$

and is the parameter to be estimated.

The groups of N sample points (data or pilot) could correspond to a time slot in CDMA systems or frames in TDMA systems. A well-known pilot-symbol sample based estimator of SINR is computed as the ratio of the square of the sample mean of the received to the pilot-symbol sample Y (based on N sample points in a group) to the corresponding sample variance is a reasonable estimator of the SINR. Estimators based on this ratio are called Squared Mean By Variance or SMV estimators. Different SMV estimators have been studied in the literature and they only differ in the normalization constant used to compute the sample variance.

For the case where the $\{Y_{kj}\}$ values correspond to pilot symbols, define the sample mean and unbiased sample variance for the kth time slot as $$\overline{Y}_k = \frac{1}{N}\sum_{j=1}^{N} Y_{kj} \tag{3}$$

$$S_k^2 = \frac{1}{N-1}\sum_{j=1}^{N}(Y_{kj}-\overline{Y}_k)^2. \tag{4}$$

Then, $$\hat{\Theta}_k = (\bar{Y}_k)^2 / S_k^2$$

is one possible SMV estimator (commonly used). The Maximum Likelihood (ML) estimator of the SINR is also an SMV estimator where a biased sample variance estimate is used in the ratio (normalization is by N rather than N−1). The signal power, $\mu_k^2$, varies due to channel fading. However, the noise variance, $\sigma^2$, changes very slowly with time, typically with the addition (departure) of a call; therefore, one can improve the overall quality of the SINR estimate by using a longer-term moving average estimate of the sample variance. This makes the "effective" number of samples used in the sample variance estimate larger and therefore more accurate. One simple method to accomplish this is through exponential smoothing of a set of sample variance estimates (called Exponentially Weighted Moving Average or EWMA). The smoothed sample variance estimate through the kth time slot would be given by:

$$\hat{\sigma}_k^2 = (1-r)\hat{\sigma}_{k-1}^2 + rS_k^2 \quad k \geq 1, \tag{5}$$

where r is the smoothing factor determined according to desired design parameters and $0 < r \leq 1$. The SINR estimate at the end of k time slots then becomes:

$$\hat{\Theta}_k = \frac{(\bar{Y}_k)^2}{\hat{\sigma}_k^2}. \tag{6}$$

The accuracy (mean and variance) of SMV estimators based on using a single group of pilots with N sample points is known in the art. However, aside from simulation results, the accuracy of SMV estimators that utilize EWMA for sample variance estimation is not known.

The inventors have analytically analyzed the accuracy of SMV estimators that utilize EWMA for the sample variance estimate and have developed accurate approximations for the bias, variance and MSE of such estimators. From this analysis, the inventors developed a characterization of the bias and variance, and hence the MSE, of such estimators. The inventors, based on their analysis, developed a scaling and translation methodology for the SINR estimators that substantially reduces the MSE. The scaled and translated EWMA SINR estimator according to the present invention is:

$$\tilde{\Theta}_k = \frac{\eta-2}{\eta}\hat{\Theta}_k - \frac{1}{N}, \tag{7}$$

where $$\left(-\frac{1}{N}\right)$$

is the translation and $\eta$ is the scaling factor defined as:

$$\eta = \frac{(N-1)(2-r)}{r}. \tag{8}$$

Note that this scaling factor $\eta$ depends only on parameters that are fixed and known at the receiver and do not require any separate estimation procedure.

Figure 2:
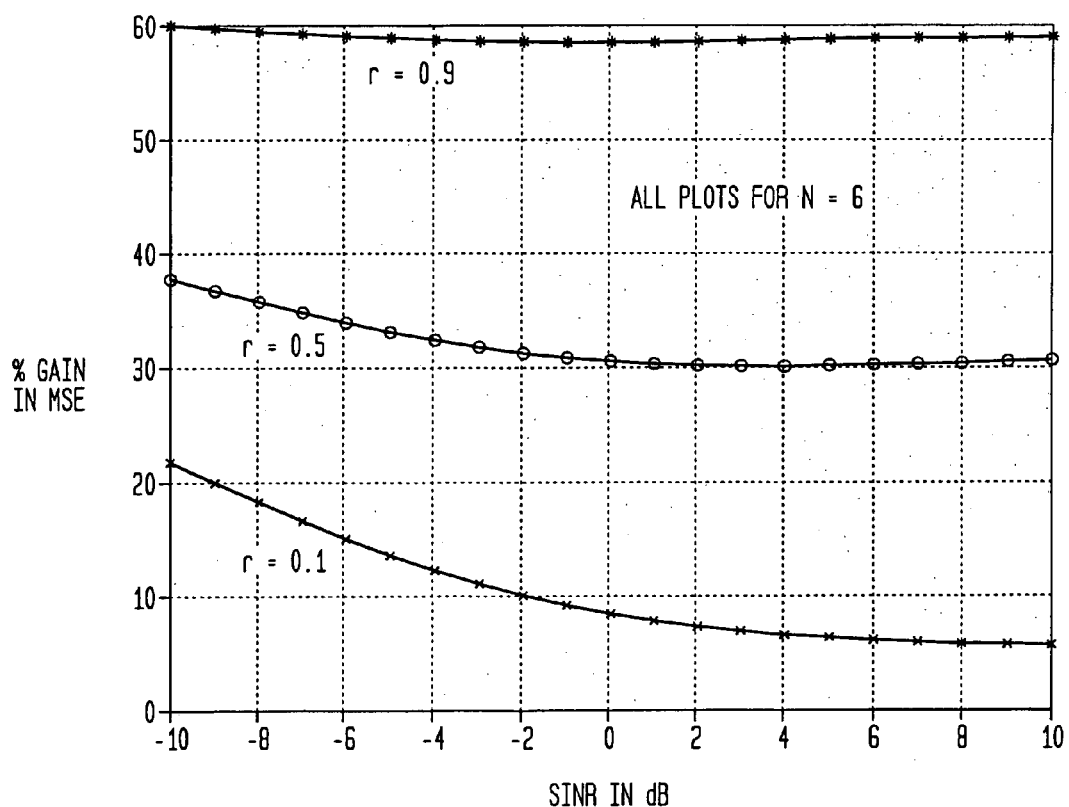
FIG. 2 illustrates the gain from the SINR estimator according to an embodiment of the present invention as compared to a conventional estimate based on pilot symbols only for different smoothing factors.

The gains due to scaling and translation (measured as the reduction in mean-squared error) in using $\tilde{\Theta}_k$ instead of $\hat{\Theta}_k$ can be substantial especially for larger values of the smoothing factor r as seen in FIG. 2. FIG. 2 illustrates the gain (measured as the reduction in MSE) based on pilot symbols only for different smoothing factors r, and show that even for values of r around 0.5–0.6, the gain is around 30–40%.

SMV estimators that use data symbols are also known in the art. A commonly used SMV estimator based on data symbols, called the non-coherent estimator, is one where the sequence $\{Y_{kj}\}$ is replaced by the sequence of its absolute values i.e. $\{Z_{kj}=|Y_{kj}|\}$. The SINR estimate for the kth time slot is the ratio of the sample mean and sample variance of the sequence $\{Z_{kj}\}$. Smoothing of the sample variance of the $\{Z_{kj}\}$ sequence via the EWMA approach may also be used to improve accuracy. While the scaling and translation approach developed in this invention can be extended to any SMV estimator based on data symbols, including the non-coherent estimator, the preferred approach is outlined in concurrently filed application Ser. No. 09/848,259 entitled "Method of Estimating a Signal-to-Interference+Noise Estimate Using Data Samples" by the inventors of the subject application.

The accuracy of the SINR estimate can be further enhanced by simultaneously utilizing estimates from pilot symbols as well as data symbols in the estimation process. As mentioned before pilot symbols have the advantage of being known at the receiver but are relatively fewer in number. Data symbols are more plentiful than pilot symbols but they are unknown at the receiver.

First, a method for the general problem of optimally linearly combining two estimates of an unknown parameter will be described. With that foundation, the combining method will be applied to SINR estimation with pilot and data symbols.

Suppose there are two noisy estimates, $\hat{\Theta}_1$ and $\hat{\Theta}_2$, respectively, of a parameter $\Theta$. Furthermore let the biases of the two estimates be $B_1 = E[\hat{\Theta}_1] - \Theta$ and $B_2 = E[\hat{\Theta}_2] - \Theta$, respectively, and the variances be $\tau_1^2$ and $\tau_2^2$, respectively. The MSE of $\hat{\Theta}_i$ is $MSE_i = B_i^2 + \tau_i^2$, i=1, 2. Consider the class of estimators formed by an arbitrary linear combination of $\hat{\Theta}_1$ and $\hat{\Theta}_2$ $$\hat{\Theta} = \alpha_1\hat{\Theta}_1 + \alpha_2\hat{\Theta}_2. \tag{9}$$

Minimum mean squared error weights $\alpha_1$ and $\alpha_2$ are obtained by minimizing $E(\hat{\Theta}-\Theta)^2$. The following are the minimum mean squared error weights $$\alpha_1^{opt} = \frac{(\Theta + B_1)\tau_2^2}{\tau_1^2(\Theta+B_2)^2 + \tau_2^2(\Theta+B_1)^2 + \tau_1^2\tau_2^2}\Theta \tag{10}$$

$$\alpha_2^{opt} = \frac{(\Theta + B_2)\tau_1^2}{\tau_1^2(\Theta+B_2)^2 + \tau_2^2(\Theta+B_1)^2 + \tau_1^2\tau_2^2}\Theta. \tag{11}$$

The corresponding minimum MSE is $$MSE^{opt} = \frac{\Theta^2}{1 + (\Theta + B_1)^2/\tau_1^2 + (\Theta + B_2)^2/\tau_2^2}. \quad (12)$$

Unfortunately, the optimum weights to use depend on the value of $\Theta$. Later in this section, we shall describe how the weights can be estimated in practice.

When two unbiased estimators are being combined (i.e. $B_1=0$ and $B_2=0$) and it is desired that the combined estimators also be unbiased, then the weights need to be constrained to sum to unity. In this case the optimal weight on $\hat{\Theta}_1$ can be shown to be $$\alpha = \frac{MSE_2 - B_1 B_2}{MSE_1 + MSE_2 - 2B_1 B_2} \quad (13)$$

and the optimal weight on $\hat{\Theta}_2$ is thus $1-\alpha=(MSE_1-B_1B_2)/(MSE_1+MSE_2-2B_1B_2)$. The MSE of the optimal constrained estimator is $$MSE^{opt} = \frac{MSE_1 MSE_2 - B_1^2 B_2}{MSE_1 + MSE_2 - 2B_1 B_2}. \quad (14)$$

When both estimators are unbiased Equation (13) reduces to the known result for optimally combining (linearly) two independent unbiased estimates.

The preceding results will now be applied to the problem of SINR estimation. Consider two estimators of the SINR, $\Theta_k$. For the purpose of illustration we select the smoothed, scaled and translated pilot-sample based estimator, say $\tilde{\Theta}_k^P$, and the smoothed, scaled and translated data-sample based estimator (e.g. the non-coherent estimator), say $\tilde{\Theta}_k^D$, as the two estimators to be combined. The inventors have shown that the biases and variances of these estimators are approximated as follows $$B_k^P = 0 \quad (15)$$

$$(\tau_k^P)^2 = \frac{2(\eta_P - 2)}{N_P^2}\left[\frac{(1+N_P\Theta_k)^2}{(\eta_P-2)(\eta_P-4)} + \frac{1+2N_P\Theta_k}{\eta_P-4}\right](\eta_P > 4)$$

$$B_k^D = \Theta_{z,k} - \Theta_k$$

$$(\tau_k^D)^2 = \frac{2(\eta_D - 2)}{N_D^2}\left[\frac{(1+N_D\Theta_{Z,i})^2}{(\eta_D-2)(\eta_D-4)} + \frac{1+2N_D\Theta_{Z,i}}{(\eta_D-4)}\right](\eta_D > 4).$$

In Equation (15), the superscript and subscript P denotes the pilot sample based variables, the superscript and subscript D denotes the data sample based variables, $N_D$ and $N_P$ are the number of data and pilot symbols respectively per time slot, $\eta_P=(N_P-1)(2-r)/r$, $\eta_D=(N_D-1)(2-r)/r$ (where r is the EWMA smoothing factor) and the quantity $$\Theta_{z,k} = \frac{\mu_{Z,k}^2}{\sigma_{Z,k}^2},$$

-continued where $$\mu_{Zk} = \sqrt{\frac{2}{\pi}}\exp\left(-\frac{\Theta_k}{2}\right) + \frac{\sqrt{\Theta_k}}{2}\left[\text{erfc}\left(-\sqrt{\frac{\Theta_k}{2}}\right) - \text{erfc}\left(\sqrt{\frac{\Theta_k}{2}}\right)\right]$$

$$\sigma_{Zk}^2 = \Theta_k + 1 - \mu_{Zk}^2$$

(erfc in the above equation is the well-know complementary error function). Using Equation (15) with either Equation (10) and Equation (11) or Equation (13) gives the optimal combined estimators of $\tilde{\Theta}_k^P$ and $\tilde{\Theta}_k^D$. Since the biases and variances, and therefore the weights themselves depend on $\Theta_k$, which is unknown, one can only estimate the weights in practice. An estimate of the weights can be obtained by replacing $\Theta_k$ by $\tilde{\Theta}_k^P$ in the corresponding expressions. One could, alternatively, replace $\Theta_k$ by $\tilde{\Theta}_k^D$ to obtain estimates of these quantities. However, since $\tilde{\Theta}_k^P$ is an unbiased estimate of $\Theta_k$, the accuracy of the composite estimate is better, when $\tilde{\Theta}_k^P$ is used. Note that the above technique for combining may be used with any two estimators as long as the appropriate bias and variance expressions are used in the weight computation. For example, one can combine unsmoothed, scaled and translated pilot and data-sample based estimators using the same approach.

Figure 3:
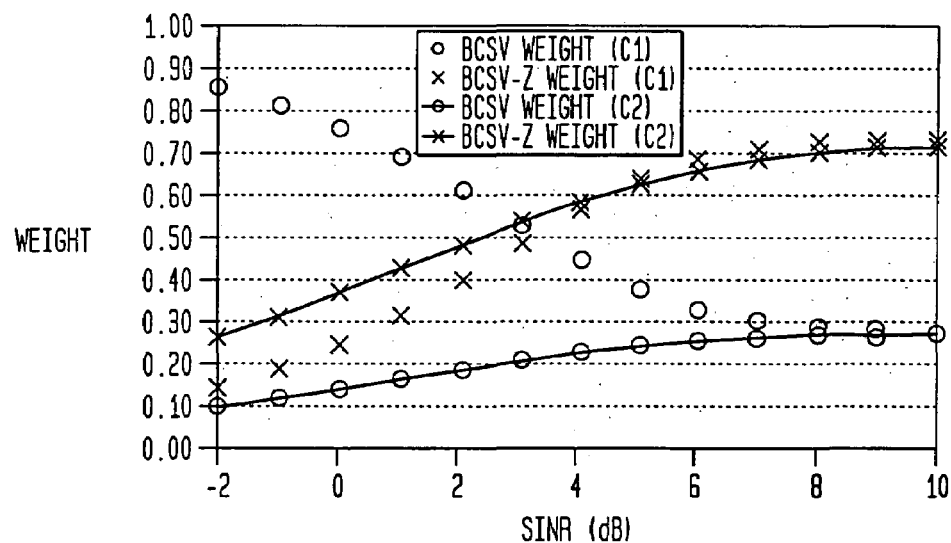
FIG. 3 illustrates optimal weights assigned to a pilot-symbol based estimator and a data-symbol based estimator in a combined estimators.
Figure 4:
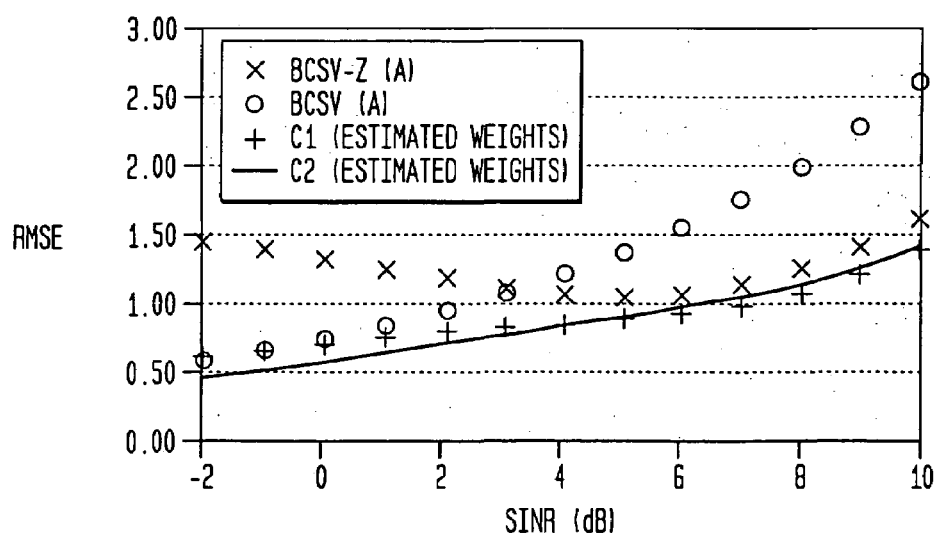
FIG. 4 illustrates the performance of the combined estimator using the estimated weights.

Let C1 denote the combined estimator of $\tilde{\Theta}_k^P$ and $\tilde{\Theta}_k^D$ that has constrained weights and C2 denote the combined estimator with unconstrained weights. The optimal weights used when $\tilde{\Theta}_k^P$ and $\tilde{\Theta}_k^D$ are combined for C1 and C2 are shown in FIG. 3, as a function of $\Theta_k$. In the figure-legend BCSV (BCSV-Z) stands for the smoothed, scaled and translated pilot (data) sample based estimator. The root mean squared error (RMSE) values for C1 and C2 when estimated weights are used are shown in FIG. 4. For comparison, the corresponding RMSE values for each of the component estimators, BCSV and BCSV-Z, are also shown. (The label "A" in the figure merely means that numerical results were obtained from analytic formulas rather than simulations). Despite the error in estimating the weights, both combined estimators outperform the individual estimators for the entire range of SINR considered.

Figure 5:
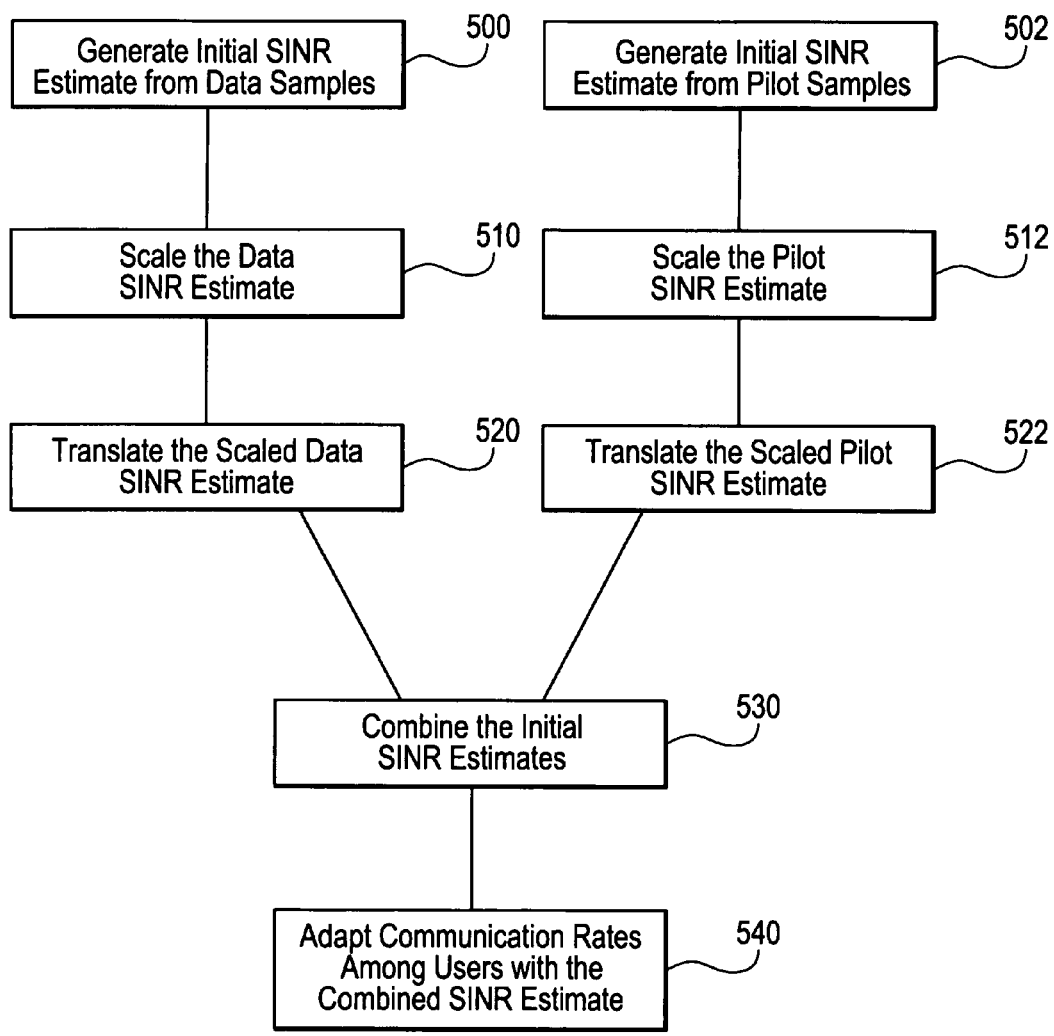
FIG. 5 illustrates a flow diagram representing a method of implementing an embodiment of the present invention.

FIG. 5 illustrates a flow diagram representing an example embodiment of the present invention. In steps 500 and 502, initial SINR estimates are generated from received data and pilot samples, respectively. In steps 510 and 512, the initial SINR estimates are scaled, and, in steps 520 and 522 the scaled SINR estimates are translated. In step 530, the scaled and translated initial pilot and data SINR estimates are combined. In step 540, the generated SINR estimate from the combining step is utilized for the adaptation of communication rates among users.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of generating a signal-to-interference+noise ratio (SINR) estimate for the adaptation of data communication rates among users, comprising:
   generating initial SINR estimates for each of a plurality of signals based on a mean of a plurality of samples of the plurality of signals and a sample variance estimate of the plurality of samples of the plurality of signals;

scaling the initial SINR estimates;
translating the scaled SINR estimates to generate the SINR estimate; and
utilizing the generated SINR estimate to adapt data communication rates among users,
wherein the translating step translates the scaled SINR estimates based on a number of the plurality of samples.

2. The method of claim 1, wherein the generating step generates the initial SINR estimates for each of the plurality of signals based on at least two sample variance estimates.

3. The method of claim 2, wherein the generating step generates a smoothed sampled variance estimate based on at least two sample variance estimates, and generates the initial SINR estimates for each of the plurality of signals based on the smoothed sample variance estimate.

4. The method of claim 3, wherein the smoothed sampled variance estimate is generated by combining a current sample variance estimate and a previous sample variance estimate based on a smoothing factor.

5. The method of claim 4, wherein the scaling step scales the initial SINR estimates based on the smoothing factor.

6. The method of claim 5, wherein the generating step generates the smoothed sample variance estimate according to the following expression:

$$\hat{\sigma}_k^2 = (1-r)\hat{\sigma}_{k-1}^2 + rS_k^2$$

where $\hat{\sigma}_k^2$=current smoothed sample variance estimate,
$\hat{\sigma}_{k-1}^2$=previous smoothed sample variance estimate,
$S_k^2$=current sample variance estimate, and
r=smoothing factor.

7. The method of claim 5, wherein the scaling step scales the initial SINR estimate based on the following expression:

$$\tilde{\Theta} = \frac{\eta - 2}{\eta}\hat{\Theta}$$

where $\tilde{\Theta}$=scaled SINR estimate,
$\hat{\Theta}$=initial SINR estimate, and $$\eta = \frac{(N-1)(2-r)}{r}$$ where $N$ = a number of the plurality of samples.

where N=a number of the plurality of samples and r=smoothing factor.

8. The method of claim 4, wherein the scaling step scales the initial SINR estimates based on the number of the plurality of samples.

9. The method of claim 1, wherein the plurality of samples include pilot symbol samples.

10. The method of claim 1, wherein the plurality of samples include data symbol samples.

11. A method of generating a signal-to-inteference+noise ratio (SINR) estimate for the adaptation of data communication rates among users, comprising:
generating a first initial SINR estimate based on a mean of a plurality of pilot symbol samples and an sample variance estimate of the plurality of pilot symbol samples;
scaling the first initial SINR estimate;
translating the first scaled SINR estimate;
generating a second initial SINR estimate based on a mean of a plurality of data symbol samples and an sample variance estimate of the plurality of data symbol samples;
scaling the second initial SINR estimate;
translating the second scaled SINR estimate;
combining the first and second translated estimates to generate the SINR estimate; and
utilizing the generated SINR estimate to adapt data communication rates among user,
wherein the scaling and translating are determined based on a bias in the first and second scaled estimates.

12. A method of generating a signal-to-interference+noise ratio (SINR) for the adaptation of data communication rates among users, comprising:
generating a first SINR estimate based on received pilot symbol samples;
generating a second SINR estimate based on received data symbol samples; and
combining the first and second SINR estimates to produce a composite SINR estimate,
wherein combining the first and second SINR estimates includes:
weighting the first SINR estimate according to a first weight;
weighting the second SINR estimate according to a second weight;
combining the first and second weighted SINR estimates to generate the SINR estimate; and
utilizing the generated SINR estimate to adapt data communication rates among users,
wherein the first weight depends on an initial estimate of the first SINR estimate and the second weight depends on an initial estimate of the second SINR estimate.

13. The method of claim 12, wherein the first and second weights sum to unity.

14. The method of claim 12, wherein the first and second weights do not sum to unity.

15. The method of claim 12, wherein the first weight depends on a bias and variance of the first SINR estimate and the second weight depends on a bias and variance of the second SINR estimate.

16. The method of claim 12, wherein
generating the first SINR estimate step includes,
generating a first initial SINR estimate based on a mean of a plurality of pilot symbol samples and a sample variance estimate of the plurality of pilot symbol samples,
scaling the first initial SINR estimate, and
translating the first scaled SINR estimate; and
generating the second SINR estimate step includes,
generating a second initial SINR estimate based on a mean of a plurality of data symbol samples and a sample variance estimate of the plurality of data symbol samples,
scaling the second initial SINR estimate, and
translating the second scaled SINR estimate.

* * * * *